Fig. 1

INVENTOR.
WILLIAM L. PAULISON JR.

INVENTOR.
WILLIAM L. PAULISON JR.

United States Patent Office 2,985,152
Patented May 23, 1961

2,985,152

VAPOR GENERATING AND SUPERHEATING OPERATION

William L. Paulison, Jr., Ridgewood, N.J., assignor to Bailey Meter Company, a corporation of Delaware Filed Nov. 19, 1951, Ser. No. 256,986

30 Claims. (Cl. 122—479)

My invention lies in the field of steam power generation and particularly in the control of steam temperature in connection with present day vapor generators. Practically all central station capacity presently being installed, or on order, in the United States has rated steam conditions about 800 p.s.i.g. and 800 FTT; the higher operating temperature being 1050 FTT at pressures from 1500 p.s.i.g. to 2000 p.s.i.g. and rated load from 500,000 to 1,000,000 lb. per hr., with a large percentage employing reheat surfaces. The problems involved in the generation and close control of the properties of steam are quite different now than was the case at the time of the inventions in this field which are shown in the prior art.

Superheat temperature control is particularly desirable in the generation of steam for the production of electrical energy in large central station power plants. In such plants, the upper limit of superheat temperature is governed by the materials and construction of the turbine served by the steam. In the interest of turbine efficiency the temperature of the steam delivered to the turbine should be maintained within close optimum limits throughout a wide range of capacities.

As feed water temperatures progressively increase there is less and less work for the boiler proper, with the result that its convection heat-absorbing surface has disappeared to the point where the modern large utility unit consists of a water-walled furnace, a convection superheater, convection reheating surface, an economizer and an air heater. Furnace design is now centering around sufficient water cooling surface to absorb the radiant heat and to achieve the required relatively low furnace exit gas temperatures.

With the superheating or resuperheating of the steam in one or more convection type heat exchange surfaces, the size and cost of such surfaces becomes a material factor in the total cost of the unit and any improvement leading to a reduction in the size of superheaters becomes of considerable importance. Usually these surfaces must be made of expensive high-alloy tubing to satisfactorily handle the temperatures and pressures encountered.

Figure 5:
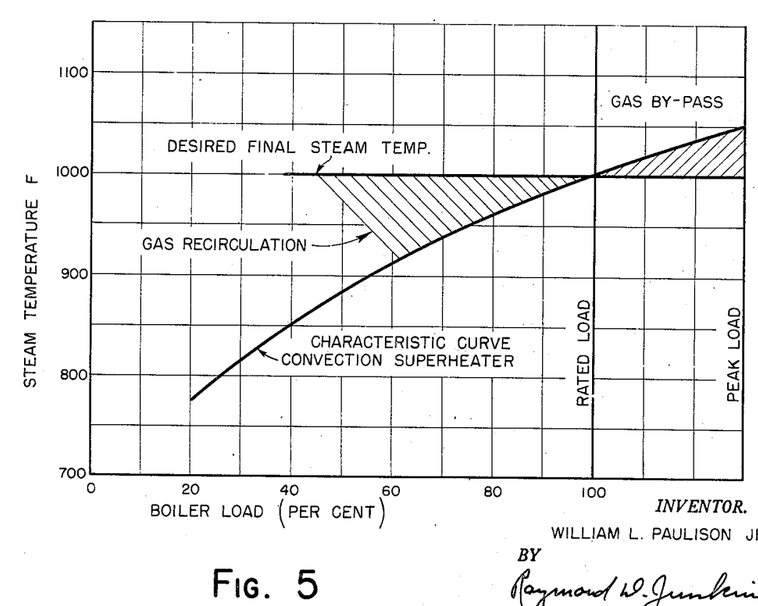
Fig. 5 is a graph of characteristic values in connection with the other figures of the drawing.

It is thus a prime desideratum, in the design of such a unit, to proportion the steam generating surfaces and the steam superheating surfaces to give the desired final steam temperature at "rated load." At "peak load," in excess of the rated load, the final steam temperature will be in excess of that desired and correspondingly at lower rating the steam temperature will not equal that desired. This is due to the characteristic curve of convection type heat exchangers which have a rising function with load (Fig. 5). It is false economy to design the superheater for desired final steam temperature at peak load, for all loads below that value would produce steam below the desired temperature. On the other hand, the design of the superheater to produce the desired final steam temperature at some rating below "rated load" would require an excessive cost of superheating surface and an excessive final steam temperature throughout the upper ratings, with consequent danger to the turbine or the necessity of extracting some of the surplus heat from the final superheated steam.

To reach the desired high superheated steam temperature, but not exceed it, requires exceedingly careful proportioning of the heat absorbing surfaces both for generating steam and for superheating it. But even if the desired superheated steam temperature be just attained initially by very careful designing at "rated load," the superheated steam temeprature will vary during operation by reason of changes in cleanliness of the heat absorbing surfaces. Slag will form and adhere to the heat absorbing surfaces in the furnace thereby reducing the effectiveness of such surfaces and raising the furnace outlet temperature of the products of combustion. Furnace outlet temperature will also change with percentage of excess air supplied for combustion, with the characteristics of the fuel burned, and with the rate of combustion and the corresponding rate of steam generation. All of these things will therefore affect the temperature of the gases leaving the furnace and supplied to the superheater surfaces, whether the superheating elements are located in the furnace where they absorb heat by radiation from the burning fuel and products of combustion, or whether they are located beyond the furnace where they absorb heat by convection from the products of combustion only.

With the furnace volume, as well as the vapor generating furnace surface, and the vapor superheating surface, fixed and invariable, the possibility of satisfactorily controlling the final steam temperature lies in controlling the volume and temperature of the gases contacting the superheating surfaces. Fuel and air supply must be varied with rating to provide the desired steam flow rate. The furnace temperature of the flame and products of combustion does not vary greatly with rating. This leaves the controllable variable as the volume and temperature of the gases entering the convection superheating surfaces. The volume or mass flow rate has been controlled in the past through by-passing some of the gas flow around at least a portion of the superheating surfaces. The temperature of the entering gases may be controlled by selecting the amount of generating surface to be contacted by the gases before they enter the superheater or by controlling the temperature and mass flow of gases leaving the furnace through recirculating cooler products of combustion to the furnace.

I preferably consider a unit which has been designed to provide the desired final steam temperature, both initial superheat and reheat, at "rated load." Throughout an upper range of rating between the "rated load" and a "peak load," I controllably by-pass at least a portion of the products of combustion around a portion of the steam superheating surfaces. As rating decreases, below "rated load" I controllably decrease the percentage of liberated heat which is absorbed by the radiant generating surfaces. At the same time the leaving temperature of the gases of combustion is raised as well as the mass flow, to the end that a greater proportion of the liberated heat is delivered to the convection superheating surfaces. This control of the temperature and volume of combustion gases is accomplished by recirculating to the furnace a variable proportion of partially cooled products of combustion abstracted from the inlet side of the air heater.

A principal object of my invention is to provide an improved method and control system effective in positioning the by-pass dampers and in controlling the recirculation of gases.

I preferably withdraw a controlled flow rate of the products of combustion from near the entrance to the air heater and after the gases have left the superheating and economizer surfaces. The recirculated gas is introduced to the furnace near or with the elements of combustion and passes to the furnace outlet with the fresh products of combustion.

Recirculation of partially cooled products of combustion is not a new device. With a water cooled furnace it is known that the heat availability of the gases at the entrance to convection superheating surfaces is increased when the percentage recirculated is increased as rating decreases. This may be due to relative increase in gas temperature and/or mass flow. The lower rating end of the convection characteristic curve is raised while the upper end may actually be lowered. The controlled change in temperature and/or mass flow rate of the gases leaving the furnace may result from different effects of the introduction of recirculated gases at different furnace locations. One theory that has been advanced is of delayed combustion and change in temperature of the combustion process. Another is the blanketing or shielding effect of the recirculated gases between the combustion process and the radiant receiving walls. Still other causes may be the dilution of the fresh products of combustion and the heating up of the recirculated gases. Actually relatively small amounts of the products of combustion are recirculated. As rating decreases from "rated load" the rate of gas recirculation is increased thus relatively decreasing the absorption of heat by the radiant generating surface while relatively increasing both the volume flow rate and temperature of the gasses leaving the combustion zone and entering the superheating surfaces. The present invention provides a control of the recirculation of products of combustion to lower the radiant heat absorption with decrease in rating and thus increase the volume and temperature of the gases leaving the furnace and entering the superheating surfaces.

My present invention provides a continuous automatic control system responsive to an indication of rating or load, such for example as steam outflow rate or air flow rate. Additionally, it employs the final reheated total steam temperature and the final superheated total steam temperature as control indexes. The system is so integrated that proper control of the superheat dampers, reheat dampers, by-pass dampers, and recirculation damper are conjointly under the control of the indexes mentioned. The total supply of fuel and air for combustion is under control of an index of demand such as steam pressure.

I contemplate and provide both method and apparatus for selective and sequential operation of the several controlled dampers from the operating variables. The selective and sequential operation of the dampers proportioning gas flow over the superheating surfaces relative to flow over the reheating surface is advantageous regardless of the use of a gas by-pass around the superheating and reheating surfaces, and is highly desirable in connection with this type of unit to avoid an attempted maintenance of either final superheated steam temperature or final reheated steam temperature at the expense of the other.

It will be appreciated that I am illustrating and describing my invention in a preferred mode of operation and combination of apparatus. For example, while I speak of steam generation and superheating, the invention is useful in the generation and superheating of other vapors. Furthermore, while I particularly refer to the burning of pulverized coal in suspension, it will be understood that the invention is applicable to the burning of other fuels in suspension, such for example, as oil or gas.

In general it may be said that for a fixed design of furnace volume, steam generating surface, and steam superheating surface, with fuel and air supplied to satisfy the rating demand, I preferably control the unit to raise the characteristic superheat curve (Fig. 5) below the "rated load" value and to lower the curve above the "rated load" value, so that a more uniform final steam temperature will be attained, throughout a wider range of operating values, than would otherwise be the case. It will be appreciated that the characteristic graph of Fig. 5 applies both to the superheating of the initially generated steam as well as to the superheating of the steam returned from the turbine or other utilizer to be reheated. While the initially generated steam may be at a considerably higher pressure than is the reheat steam, the desired total temperature to which the two steam flows are to be raised is substantially the same. I preferably raise the curve at the lower ratings by gas recirculation and lower the curve at the upper ratings through by-passing at least a portion of the heating gases around a portion of the superheating surfaces.

Figure 1:
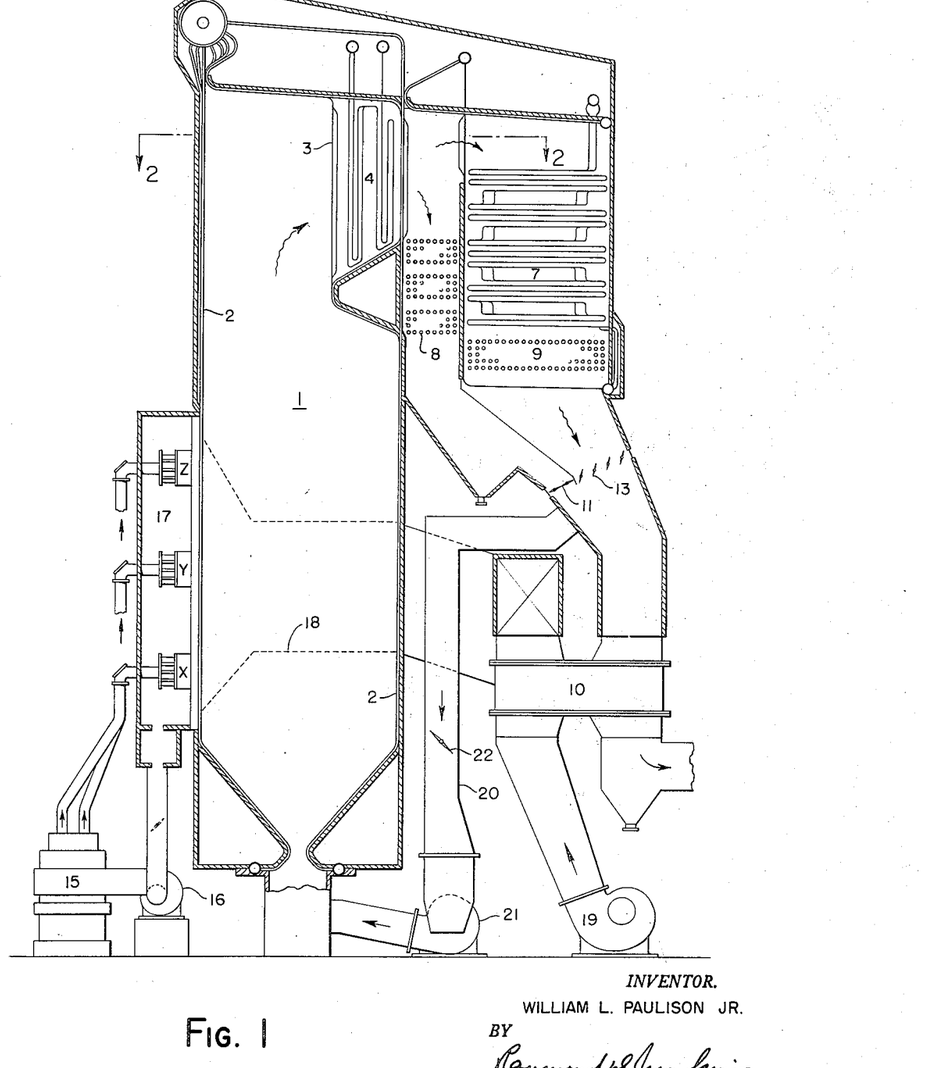
Fig. 1 is a somewhat diagrammatic sectional elevation of a vapor generating unit having radiant generating surfaces and convection superheating surfaces. The section is taken generally along the line 1—1 of Fig. 2, in the direction of the arrows.
Figure 2:
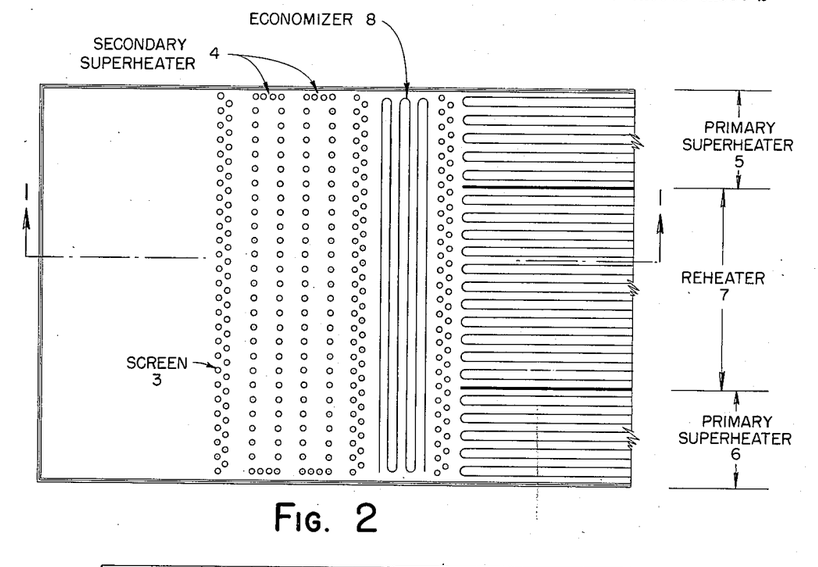
Fig. 2 is a section, to somewhat different scale, along the line 2—2 of Fig. 1 in the direction of the arrows.

Fig. 1 shows in somewhat diagrammatic sectional elevation a typical vapor generator of the size and type herein contemplated and in connection with which I will explain my invention. Fig. 2 is a section, in the direction of the arrows, along the line 2—2 of Fig. 1. Reference may also be made at this time to Fig. 5 to observe the normal characteristic curve of a convection superheating surface so designed as to produce final steam temperature 1000 FTT at 100% rated load. From this curve it will be observed that the expected final steam temperature would be in the neighborhood of 1050 FTT at peak load and would fall off throughout the lower ratings.

The generator is of the radiant type, having a furnace 1 which is fully water-cooled with the walls 2 of vertical closely spaced plain tubes constituting the vapor generating portion of the unit. Products of combustion pass upwardly through the furnace 1 in the direction of the arrow, through the tube screen 3, over a secondary superheater surface 4 and then through primary superheaters 5 and 6 and a reheater 7. A tubular economizer section 8, 9 is followed by an air heater 10. Heated gases leaving the secondary superheater 4 may be divided through one path including the primary superheaters 5, 6, the reheater 7, the economizer section 9; and a second path including the economizer section 8. The reunited flow of gases then passes through the air heater 10. Distribution of the gases between the two paths is by means of dampers 11 and 12, 13, 14. (See Fig. 3.)

Reference to Fig. 2 will show that the secondary superheater 4 is spanned by the primary superheater 5, the reheater 7 and the primary superheater 6. Thus Fig. 1 shows an end view of the dampers 13 below the reheater 7, while the dampers 12 for primary superheater 5 would be beyond the dampers 13, and the dampers 14 for primary superheater 6 would be (not shown) toward the viewer. The invention contemplates the desirable sequence of operation of dampers 11, 12, 13 and 14 to controllably vary the flow of products of combustion through the different heating sections 5, 6 and 7 as well as the economizer sections 8 and 9. When dampers 11 are closed, then all of the products of combustion or heating gases pass through the primary superheaters 5 and 6 and the reheater 7 to the economizer section 9. Distribution of the heating gases between the primary superheaters and the reheater is by the relative positioning of the dampers 12, 13 and 14.

The unit is fired by three horizontal rows of burners which I have designated as X, Y and Z. There may be one or more burners in each horizontal row and the burners are supplied with fuel through a plurality of mills 15 and primary air fans 16. The additional secondary air for supporting combustion is supplied to the burner box 17 through one or more ducts 18 from the air heater 10. One or more forced draft fans 19 are shown but I have not shown the usual induced draft fan or fans at the outlet of the air heater 10 for aiding in the extraction of products of combustion from the unit to the stack.

At the entrance to the air heater 10, following the dampers 11, 12 13 and 14, I join a duct 20 leading to a recirculation fan 21 which discharges to the hopper bottom of the combustion zone 1. Located in the duct 20 is a recirculation damper 22 and it is not important in the present consideration to determine the exact location of this damper relative to the fan 21. It suffices to say that the damper 22 effectively controls the rate of flow of the gases recirculated to the furnace 1 when the fan 21 is in operation.

Preferably the total supply of fuel and air to support combustion within the combustion zone 1 is under control of an index of demand, such for example as steam pressure (Fig. 4) indicated as a Bourdon tube 23 arranged to position a movable element of a pneumatic pilot valve 24. Such control of supply of the elements of combustion is known and need not be herein more fully described. Another index of demand, rather than steam outflow pressure, may be used to control the supply rate of elements of combustion.

Figure 3:
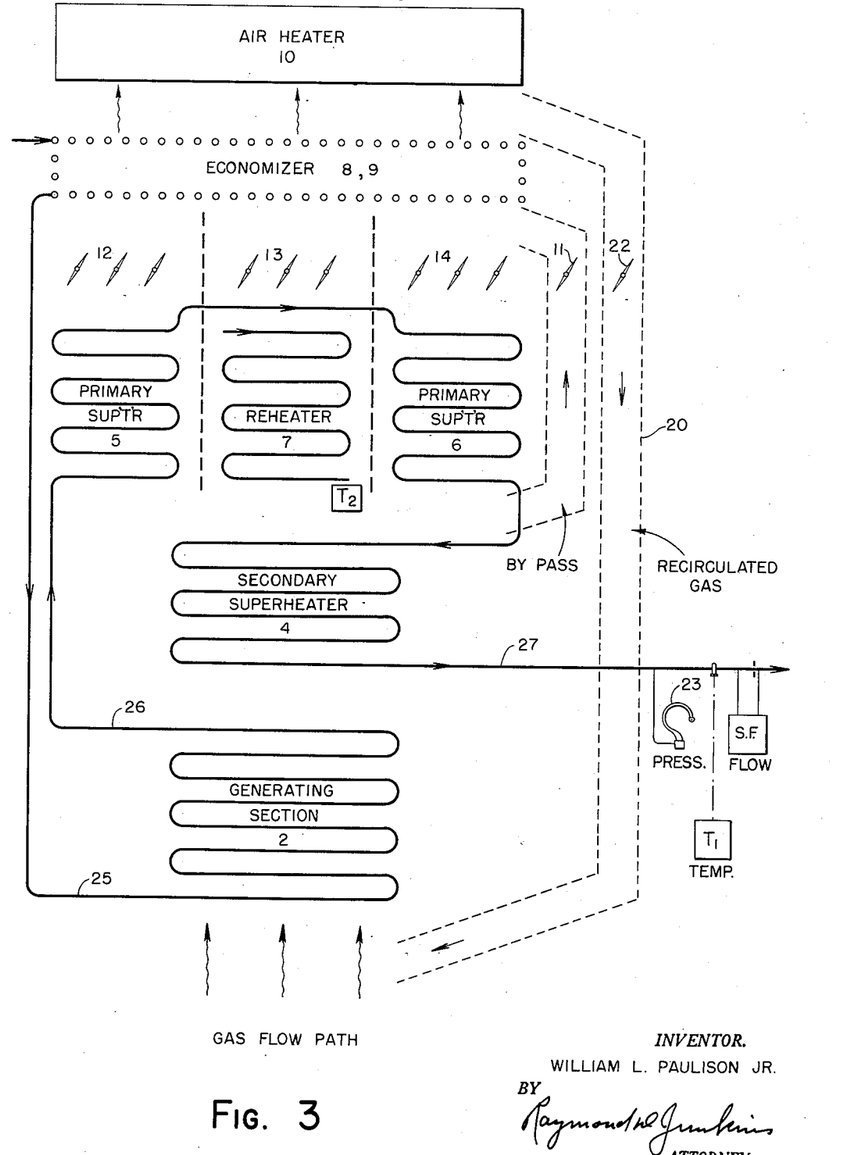
Fig. 3 is a diagrammatic showing of my invention in connection with gas by-pass and gas recirculation.

Referring now to Fig. 3 I show therein in very diagrammatic form the gas flow path in relation to the different heat exchange surfaces. The gases first contact the generating section 2 and then pass through the various superheating surfaces prior to reaching the economizer and the air heater. A by-pass is diagrammatically shown around at least a portion of the superheating surfaces. I further show that the recirculating gas duct 20 joins the gas flow path at the entrance to the air heater 10 to recirculate gases to a location relatively near the entrance of generating section 2.

Feed water leaving the economizer 8, 9 joins the generating surface (diagrammatically) through a pipe 25 and leaves the generating section through a pipe 26 to enter one of the primary superheaters. The pipe 26 may branch to enter the two primary superheating portions in parallel or the flow may be in series as is shown in Fig. 3. Vapor leaving the primary superheaters 5, 6 passes through the secondary superheater 4 and leaves the unit through a main steam line 27 to a turbine or other utilizer. Steam at a lower pressure returns from the turbine to the reheater 7 where its temperature is again raised to the desired value which may be also 1000 FTT.

In connection with the steam outflow pipe 27 I provide a rate of flow meter SF, a device $T_1$ sensitive to the final steam temperature and a pressure sensitive Bourdon tube 23 previously referred to. At the outlet of the reheater 7 is shown a temperature measuring device $T_2$ to which reference will later be made.

Figures 4, 4A:
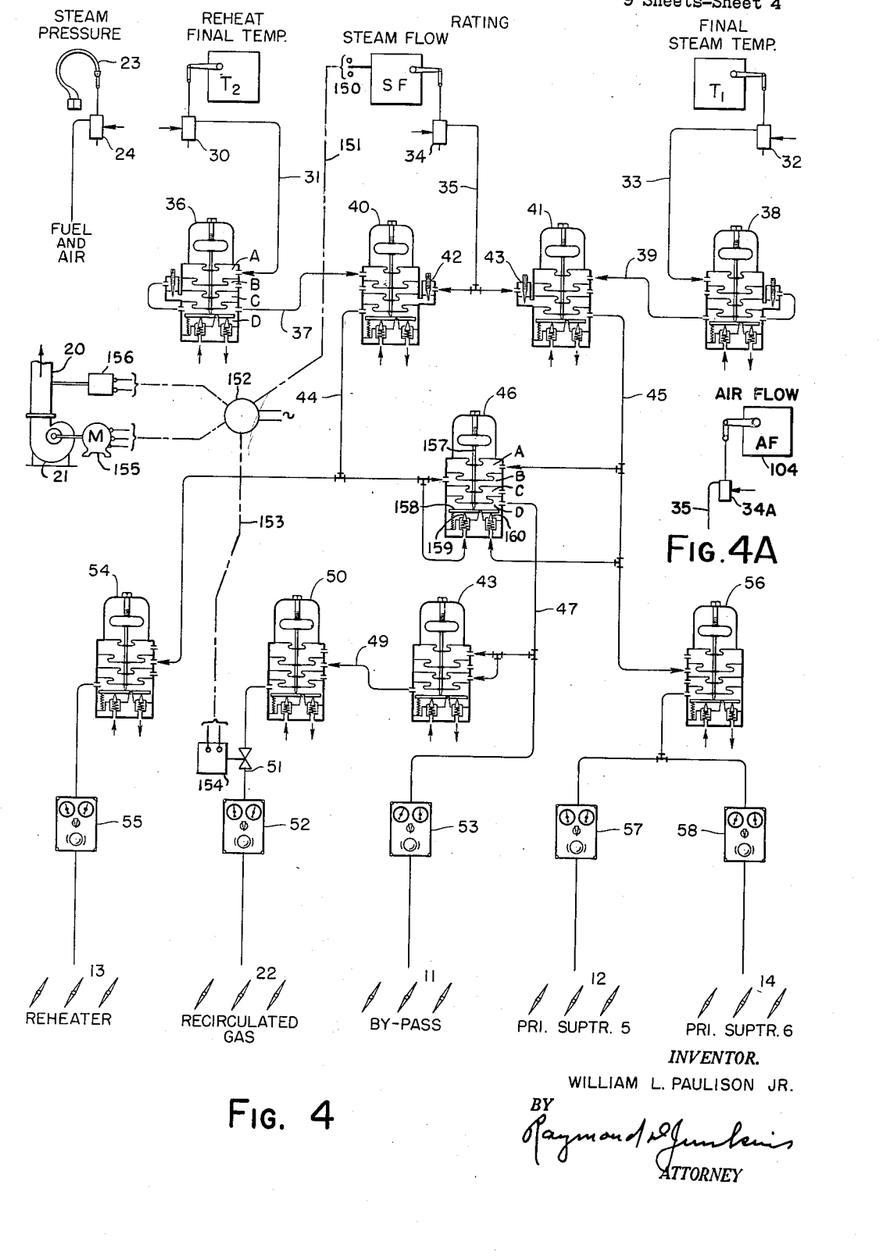
Fig. 4 is a schematic showing of the complete control system in connection with Fig. 3.
Fig. 4A is a modification of Fig. 4 wherein the steam flow meter of Fig. 4 is replaced, as a rating or load index, by an air flow meter 104 positioning a pneumatic pilot valve 34A to establish in the pipe 35 a pneumatic loading pressure continuously representative of air flow rate.

In Fig. 3 I have not shown any representation of the burners or of the various control instrumentalities (Fig. 4) which may be said to be intermediate the variable measuring devices 23, $T_1$, $T_2$, and SF, and the controlled dampers 11, 12, 13, 14 and 22. Reference to Fig. 4 will show in diagrammatic or schematic fashion the preferred control system. I have felt for simplicity that it is better to separate the showings of Figs. 3 and 4 and that the result will be understandable in connection with the following description.

In Fig. 5 I have shown that the expected characteristic curve of convection superheating surface crosses the desired 1000 FTT final steam temperature line at "rated load" and rises to a value of approximately 1050 FTT at "peak load." The shaded area between rated load and peak load represents the operating area of the gas by-pass to prevent excessive heat being applied to the superheating surfaces over that rating range. The shaded area below "rated load" indicates the deficiency of temperature in the final steam if the expected characteristic curve were experienced. This shaded area indicates the additional heat desirably to be supplied to the entrance of the superheating surfaces to raise the final steam temperature to the desired value of 1000 F. This is preferably accomplished through gas recirculation. The control system of Figs. 3 and 4 is designed to accomplish this result.

It will be understood that an operation with rating may be accomplished in two different manners. The gas recirculation control and the gas by-pass control may be substantially end-to-end sequentially as is theoretically indicated in Fig. 5 so that the gas recirculation control (upon increase in rating) ceases at the "rated load" line and the gas by-pass control immediately begins. As a matter of fact as soon as the gas by-pass damper 11 begins to open there is an initial flow therethrough. Furthermore, when the gas recirculation fan is started there is of course a minimum flow through the recirculation duct 20. In other words, gas recirculation control can hardly be expected to fade out to zero at "rated load" point and the gas by-pass control to start from zero. Each of these will probably have a finite value of starting and ending.

From a practical standpoint the control system will probably be adjusted to have a slight overlap so that when gas recirculation is stopped, there will have already been some slight opening of the gas by-pass damper and vice versa. Conversely it may be desirable (rather than having an overlap) to have the gas recirculation damper control cease slightly before reaching the rated load line, and to have gas by-pass start slightly thereafter; thus providing a slight gap between the two operations. The control system provides adjustability for any desired combination of such controls.

In Fig. 4 I show the reheat final temperature controller $T_2$ arranged to position the movable element of a pneumatic pilot valve 30 thereby continuously establishing in a pipe 31 a fluid loading pressure representative of the total temperature of the reheated steam. Similarly the controller $T_1$ is arranged to position a movable element of a pilot 32 continuously establishing in a pipe 33 a fluid loading pressure representative of final temperature of the superheated steam after it has passed through the primary and secondary superheaters and is leaving the unit.

As an indication of rating or load upon the unit, I show a steam flow rate meter SF positioning the movable element of a pilot valve 34 continuously establishing in a pipe 35 a fluid loading pressure representative of total steam flow.

The pipe 31 joins the A chamber of a standardizing relay 36 which may be of the type described and claimed in the Gorrie Patent Re. 21,804 and whose output communicates with a pipe 37. Such a relay provides a proportional control with reset characteristics. It provides for the final control index of the reheater (final reheat temperature) a floating control of high sensitivity superimposed upon a positioning control of relatively low sensitivity. A function of the adjustable bleed connection of the relay 36 is to supplement the primary control of the pressure effective in pipe 37 with a secondary control of the same or of different magnitude as a follow-up or supplemental action to prevent over-travel and hunting.

Similarly the pipe 33 joins the A chamber of a relay 38 whose output is effective in a pipe 39. The pipe 37 joins the A chamber of an averaging relay 40 while the pipe 39 joins the A chamber of an averaging relay 41. The relays 40, 41 may be of the type described and claimed in the Dickey Patent 2,098,913.

Pipe 35 joins the C chambers of relays 40, 41 through adjustable restrictions 42 and 43 respectively. The output of relay 40, available through a pipe 44, joins the B chamber of a relay 46 while the output of relay 41, through pipe 45, joins the A chamber of the relay 46. The relay 46 is known as a selective relay and its output, available in a pipe 47, enters the A and C chambers of a doubling relay 48. The output of relay 48, available through a pipe 49, enters the B chamber of a reversing relay 50 whose output, available in the pipe 51, passes through the selector valve 52 to control the positioning of the gas recirculation dampers 22. At the same time the loading pressure in pipe 47 passes through a selector valve 53 to control the by-pass dampers 11. Thus it will be seen that the output of the selective relay 46 is simultaneously available for positioning the recirculating dampers 22 and the by-pass dampers 11 but with the possibility of different effectiveness thereupon. For example, the adjustment of relays 48, 50 provides the operation of dampers 22 at a different rate and different direction of operation than the dampers 11. Sequential operation of dampers 22 and 11 is possible either with or without overlap as previously mentioned in connection with the graph of Fig. 5.

The output of relay 40 is also effective upon the B chamber of a reversing and calibarting relay 54 and through a selector valve 55 to position the reheater dampers 13. The output of relay 41 through pipe 45 is also effective upon the B chamber of a reversing and calibrating relay 56 and through selector valves 57 and 58 to position the dampers 12 and 14.

The manual-automatic selector valves 55, 52, 53, 57 and 58 are preferably of the type disclosed in the patent to Fitch 2,202,485 providing a possibility of hand or automatic control of the responsive dampers.

In general the operation of Fig. 4 is as follows: The reheat dampers 13 are under the conjoint control of an indication of rating and with a check back from the final controlled element, namely reheat final temperature $T_2$. The superheater dampers 12, 14 are under the control of rating and final steam temperature $T_1$. At the same time rating, final steam temperature $T_1$ and reheat final temperature $T_2$, conjointly act to control the recirculation dampers and the by-pass dampers selectively in accordance with either final steam temperature $T_1$ or final reheat temperature $T_2$.

Referring to Fig. 5 it will be observed that through a certain span of lower ratings it is desired that gas recirculation be controlled while through a selected upper span of ratings it is desired that the gas by-pass be in operation. At the "rated load" point the two controls may or may not overlap in sequential operation as has previously been explained. At some low load, for example 40% or "rated load" the full effectiveness of recirculation is attained and, if rating is had at very low loads, below 40% for example, it is not expected that gas recirculation would be used and probably the recirculating fan would be stopped and the recirculating dampers 22 would be closed.

Thus at very low ratings, such as when starting up or stand-by service, the following conditions will exist:

(a) Gas recirculation fan is stopped
(b) Gas recirculation damper is closed
(c) By-pass damper is closed
(d) Reheat damper is open
(e) Two superheat dampers are open As the load rises, the gas recirculation damper 22 (and fan 21) and by-pass damper 11 operate in sequence from the loading pressure in pipe 47 output of relay 46 and in accordance with whichever temperature controller $T_1$ or $T_2$ is lagging. The temperature which is leading will close the superheat dampers or reheat dampers the proper amount to balance the two temperatures.

Assuming control starts at a rating of approximately 40% of "rated load" and is increasing toward "rated load." At this predetermined point a contact 150 in the steam flow meter closes, which starts the recirculating fan 21, and permits the recirculation damper 22 to open. The contacts 150 are electrically connected by a cable 151 to a junction center 152 which receives cable 153 from a solenoid actuated valve 154 inserted in pipe 51. Recirculation fan 21 is driven by a motor 155 electrically connected to junction center 152. A pressure switch 156 is sensitive to pressure within duct 20 and is electrically joined to 152. The lower of the two temperatures ($T_1$ or $T_2$) will then regulate the recirculation damper 22 to maintain this temperature. The higher of the two temperatures will close the main damper to maintain its temperature. For example:

If the superheat temperature $T_1$ leads the reheat temperature $T_2$, the impulse from the controller $T_1$ will not pass through the selective relay 46. The impulse in 45 will continue to build up until the two superheat dampers 12, 14 are partially throttled. This forces gas through the reheat section of the unit and balances the temperatures in the two sections. Reheat temperature, being the lower of the two, will pass its impulse (from controller $T_2$) through the selective relay 46 and control the recirculation damper 22 and by-pass damper 11.

As the load rises, the recirculation damper 22 will be throttled, and when finally closed a pressure switch 156 will stop the recirculation fan. As the load still rises, the by-pass damper 11 begins to open. All this time the superheat dampers 12, 14 are throttled to keep the superheat and reheat sections in step with each other; that is, their temperatures equalized.

The construction and operation of a selective relay such as relay 46 is described in the Hartman Patent 2,556,081. Four pressure receiving chambers A, B, C, D have movable walls joined to a spring-loaded rod 157 which bears on a pivoted spring-loaded beam 158. Downward movement of rod 157 opens spring-loaded inlet valve 159, while upward movement of 157 opens exhaust valve 160. Pipe 44 communicates with the B chamber and joins the inlet valve 159. Pipe 45 communicates with the A chamber and joins the exhaust valve 160.

If the pressures in pipes 44 and 45 are equal, then the A and B chamber loading on rod 157 is balanced and the valves 159, 160 are both closed (or equally open). If one of the pressures, for example that of pipe 45, increases, then its effect in the A chamber is greater than the pipe 44 effect in the B chamber, rod 157 acts downwardly, valve 159 is opened and the pressure of pipe 44 is effective in the D chamber and pipe 47. Conversely, should pressure in 44 predominate, the rod 157 acts upwardly, valve 160 opens, and pressure of pipe 45 is admitted to the D chamber and pipe 47. Thus the recirculation damper 22 and bypass damper 11 are selectively under control of the lesser pressure of pipes 44 and 45.

Ultimately the by-pass damper 11 becomes wide open and, if necessary, both reheat and superheater dampers are throttled to maintain temperature.

As the load drops, the same balance of operation holds true. When the by-pass damper 11 becomes closed, the recirculation fan 21 starts up and the recirculation dampers 22 gradually open. Then when the vapor flow gets down to the predetermined low rating of, for example, 40%, the recirculation fan stops and the recirculation damper closes.

The necessary, and known, adjustabilities are provided in the various controllers, recorders, relays and control drives, to the end that a desired sequence of operation of the recirculating dampers and by-pass dampers are provided, with or without overlap as may be desired. The selective relay 46 may be so adjusted that the steam temperature control by way of by-pass damper and recirculating dampers is dominated by either reheat final temperature $T_2$ or final steam temperature $T_1$ as the desirable case may be.

I have explained the sequential operation, with or without overlap, of the dampers 22 and 11. In similar manner the reheat damper 13 and/or the superheater dampers 12, 14 are sequentially related in their positioning with relation to the dampers 22 and 11, as well as with each other. The by-pass damper and the superheat dampers may be in sequence at one time and alternately the by-pass damper and the reheat dampers at another time. For example, on an increasing load I get my control primarily from gas recirculation which is controlled from the lower of $T_1$ or $T_2$. The higher of $T_1$ and $T_2$ governs its particular dampers. If the superheat temperature is controlling the gas recirculation then the reheat temperature is controlling the reheat damper to line that up in proper relationship to the superheat dampers. As the load increases and the gas recirculation reaches the end of its travel, then the bypass damper becomes effective, and if the load continues to increase beyond the effectiveness of the by-pass damper then the superheat control pinches down on the superheat dampers. All this time the reheat damper is kept in its proper position to maintain reheat final temperature and keep the reheat damper and superheat dampers in proper distribution of the gases not by-passed.

The over-all operation is to supply the total rate of fuel and air for combustion to satisfy overall demand upon the unit. At the same time the superheater and reheater dampers 12, 13 and 14 are properly positioned to distribute the heating gases between the two sections of primary superheater and the reheater section. Steam temperature control for both the generated steam and for the reheated steam, under the control of by-pass dampers and recirculating dampers is selectively, through selective relay 46, in accordance with any unbalance of final temperature of the two steam flows.

Figure 6:
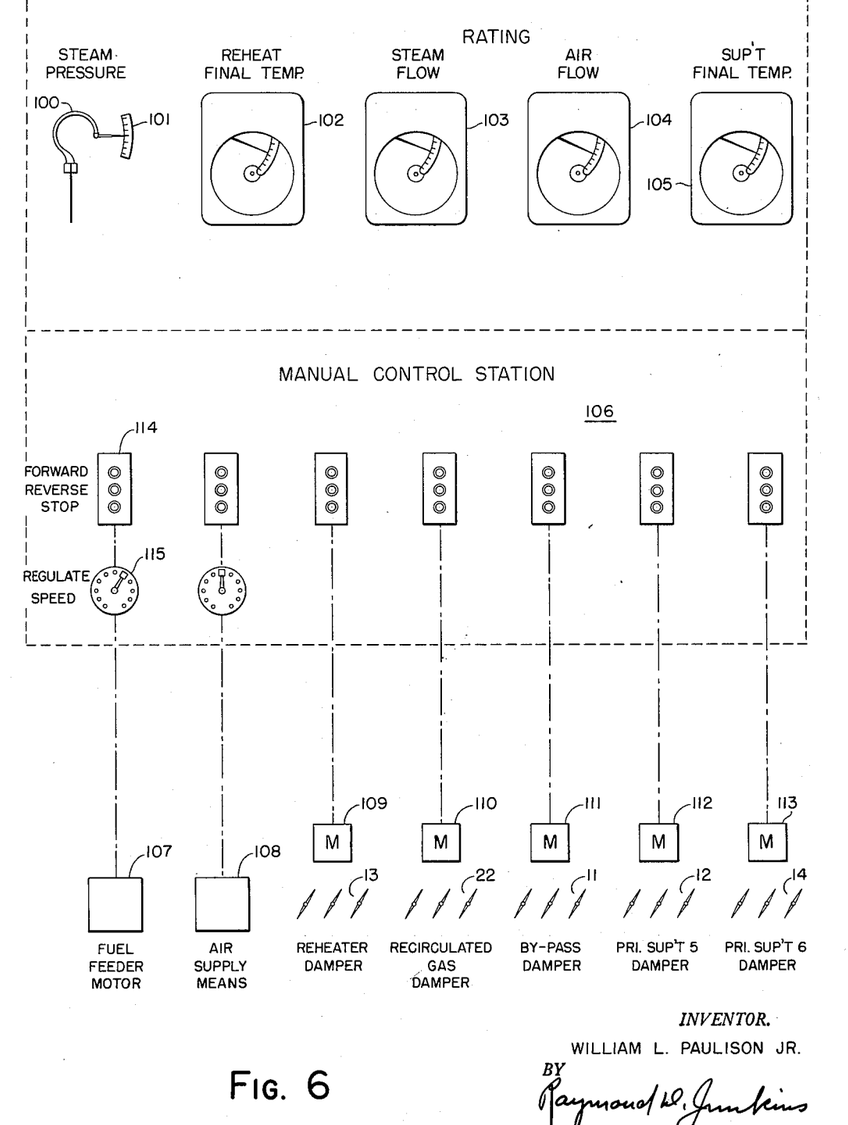
Fig. 6 is a diagram of indicators and controllers for manual performance of my improved method of operation.

In Fig. 6 I have schematically illustrated certain indicating instrumentalities useful as a guide for manual remote control of the variable operating factors to allow manual operation of the unit in accordance with my new methods.

A Bourdon tube 100 is sensitive to generated vapor pressure and provides a visual indication thereof on a scale 101. The indicating-recording meters 102, 103, 104 and 105 provide visual manifestations of final reheat temperature, vapor outflow rate, air flow rate and final superheated vapor temperature respectively. The points of measurement of these operational variables may be widely scattered but I preferably group the meters at a central control location having a Manual Control Station 106.

The air flow instrument 104 is preferably arranged to be responsive to the total air supplied for combustion, for example through the duct 18, and which does not therefore include the volume of recirculated gases.

In the lower portion of Fig. 6 I show the various control devices for moving dampers, etc., by power means. These will usually be located at a considerable distance from each other and from the Station 106.

107 represents the usual electric motor or motors for fuel supply control to pulverizer mills. 108 indicates a forced draft fan or damper or similar air supply means. At 109, 110, 111, 112 and 113 I indicate reversing motors for positioning the dampers 13, 22, 11, 12 and 14 respectively.

The Control Station 106 is usually centrally located and is provided with electrical switches, etc., for controlling the motors and devices mentioned. 114 represents a Forward-Reverse-Stop electric push-button station for controlling the motor 107. Rheostat 115 allows speed control of motor 107. Motor 108 is also provided with speed control, but this is not deemed necessary for motors 109, 110, 111, 112, 113.

It will now be clear that my improved methods of operation of the unit may be manually performed by an operator located at the Manual Control Station 106, observing the measuring instrumentalities, and selectively remotely activating the controls 107, 108, 109, 110, 111, 112 and 113. Selective and sequential operation may be obtained, as well as proper proportioning of the gases over the superheater and reheater, with or without, the by-pass in service.

It is understood in this art that either vapor outflow rate or air flow rate may be used as an index of output or rating. By "air flow" I intend to include the rate of flow of the gaseous products of combustion and excess air passing through the unit although care must be taken to distinguish between such primary air flow and the recirculated products of combustion. If the measurement is taken of the total gases entering the superheating surfaces, then it must be compensated to take into account the percentage of volume recirculated. Under certain conditions I preferably employ the "air flow" index while under certain conditions I use steam flow of either the primarily generated steam or of the reheated steam as an index of demand upon the unit.

In Figs. 7, 8, 9 and 10 I have plotted graphs of conditions and operations in accordance with my invention, in connection with a vapor generating and superheating unit of the general type herein contemplated, under four representative design and operating situations.

For the purpose of the present disclosure I use certain terms to mean:

"Controllable Load Range" for the expected controllable range of the unit operation from Peak Load downwardly to some steam rating below which the convection characteristic drops off so rapidly that steam temperature is expectedly uncontrollable. In this disclosure the controllable range of unit operation may be from 1,000,000 lb. per hr. down to some 400,000 lb. per hr.

"Control Point" or "Standard" or desired value of final total steam temperature, for example, 1000 FTT. This may be for either the primary superheat (SH) or the reheat (RH). The Control Point may be the same, say 1000 FTT, for both SH and RH, or it may be different, say 1000 FTT and 950 FTT, in which case the instrumentalities are biased so that the control action is as though they were of equal value.

"Peak Load" the maximum expected load for the capacity of fans, feeders, etc. For example, 1,000,000 lb. per hr.

"Rated Load" the most efficient continuous operation load for which the unit has been designed. For example 700,000 lb. per hr.

"Control Point Load" may be defined as that load at which the gas flow from the furnace, when the fuel burning equipment is operated at optimum efficiency, has the correct total heat content to provide for superheating of the high pressure steam and reheating of the low pressure steam through optimum predetermined temperatures, there being no operative corrective steps, such as gas recirculation, taken to modify the amount of heat absorption in the furnace. In a multiple parallel pass unit the design is presumably such that the gas flowing from the furnace is (at control point load) so divided between the passes that the optimum temperature of the superheat and reheat is attained.

Figure 7:
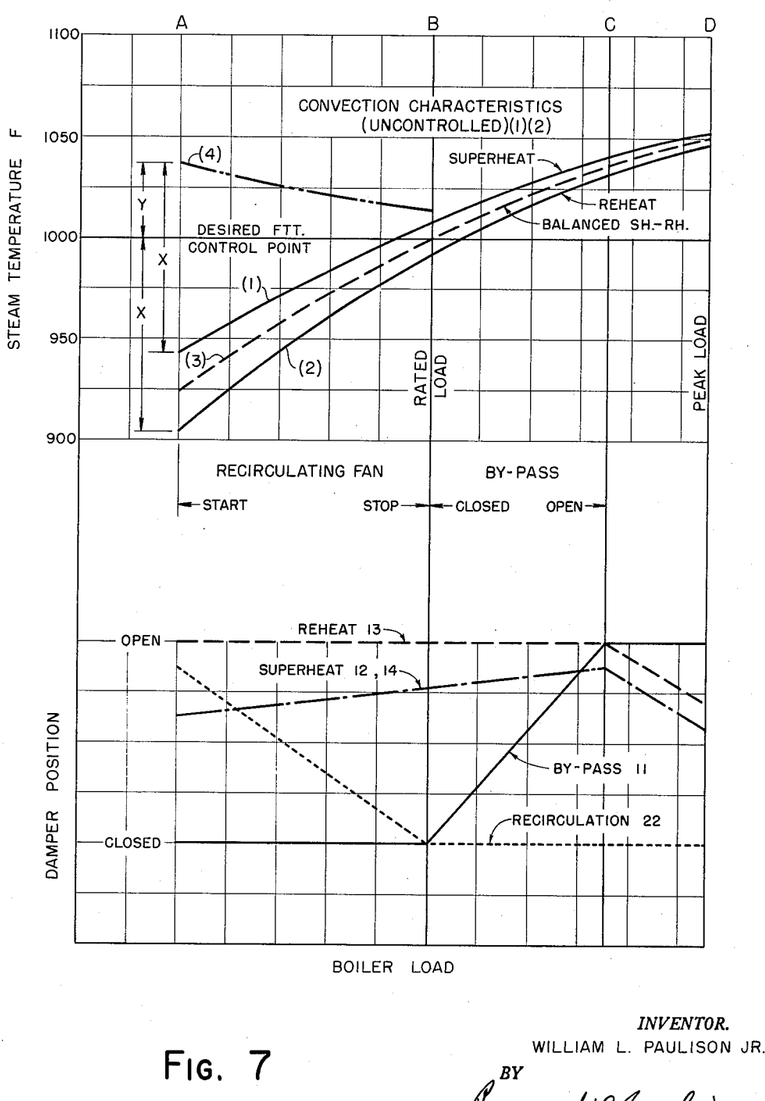
Figs. 7, 8, 9 and 10 are graphs of operating conditions of a vapor generating and superheating unit of the type herein contemplated, for four representative design possibilities, and with the method and apparatus of the present invention.

Referring now to Fig. 7 I show therein certain characteristics and conditions for a unit having usual design location and proportionality of heat transfer surfaces. With a Control Point of 1000 FTT the expected uncontrolled convection characteristic for superheat surface is represented by curve (1) over the Controllable Load Range A—D. The expected uncontrolled convection characteristic for the reheat surface is represented by curve (2) over the same load range. The uncontrolled condition of the superheat temperature is higher than the reheat temperature which rises faster than the superheat with increase in load. This is customary.

If the SH and RH were balanced they might be represented by curve (3) passing through the Control Point at Rated Load which would then be Control Point Load. With increase in load the balance curve (3) reaches Peak Load at 1050 FTT. With decreasing load, curve (3) indicates 925 FTT as the lower limit of the Controllable Load Range.

It is apparent that, throughout A—D, SH must be brought down and RH must be raised if curve (3) is to be attained. Then throughout load range A—B the balance curve (3) must be raised, while throughout load range B—D curve (3) must be lowered, if Control Point is to be attained throughout A—D.

With my invention gas recirculation is provided through load range A—B. Gas by-pass is practiced through load range B—C to the limit of its availability.

Recirculation affects both SH and RH so that a corrective effect X moves curve (1) to some location (4) and curve (2) to coincide with Control Point line. Area Y is removed by proportioning the gas flows over the SH and RH surfaces.

When, hereafter, I use the term "throttled" with reference to the position, or positioning, of a damper, I intend to mean that the damper is in some position between "closed" and "open." If a damper is "closed" it is theoretically shutting off all flow of gases therethrough. If it is "open" then the damper theoretically allows flow of gases therethrough unimpeded by the damper. At any intermediate damper position the gas flow is "throttled" or impeded as to its free flow and, while it may be more strictly correct to speak of the gas flow as being "throttled in different degree" at different damper positions, it is not incorrect to say that the damper is "throttled" or in a throttling position. Whether the damper is moved in an opening direction or in a closing direction it is still in a throttling position so long as it is not "closed" or "open." Thus, referring to Fig. 7, the damper 22 is "throttled" i.e. in "throttling position" from A to B and is "closed" from B to D. Damper 11 is closed from A to B and is "throttled" from B to D even though its throttling action is in a decreasing direction from B to C and in an increasing direction from C to D. Damper 13 is open from A to C and throttled from C to D. Dampers 12, 14 are throttled from A to D.

With the invention disclosed, recirculation of gases, distribution of gases over SH and RH surfaces, and by-pass, contribute to produce substantially constant Control Point temperature of both SH and RH over the Controllable Load Range through damper positioning as plotted at the lower portion of Fig. 7.

Through the lower load range A—B in which gas recirculation is accomplished, SH dampers 12, 14 will be throttled, RH damper 13 will be wide open, recirculation damper 22 will be throttled, and by-pass damper 11 closed. Over this load range A—B, recirculation of gases will raise both curves (1) and (2). SH being higher than RH, the pressure in pipe 45 (Fig. 4) will throttle SH dampers 12, 14 while the lesser of the temperatures (RH) acts through relay 46 to regulate recirculation damper 22. Pressures in pipe 44 might indicate a requirement for more heating gas over RH surfaces but RH dampers 13 are already open.

Through the next load range B—C, after the recirculation fan is stopped and damper 22 closed, the SH dampers 12, 14 will continue to be throttled under control of SH temperature which is the higher, the RH dampers 13 will remain wide open under control of the lower RH temperature, and the gas by-pass will be gradually opened up to some load C where it is wide open.

Through load range C—D, the by-pass damper 11 remains wide open and both RH dampers 13 and SH dampers 12, 14 are throttled to force heating gases through the by-pass.

Throughout the entire Controllable Load Range A—D the SH dampers are being throttled because SH temperature is higher than RH temperature. RH, the lower temperature, has accepted heating gases by a wide open damper until the by-pass damper reached its full opening and then was throttled along with the SH dampers. It will be seen that the selective relay 46 functioned throughout the range to sense the interrelation of SH and RH temperatures and select the one which was to control certain dampers. Had the temperature lines (1) and (2) crossed at any time, the selective relay 46, calibrating relays 54, 50, 48, 56, as well as the adjustments of all controlling and controlled elements, would have provided selective and sequential control of the various dampers as will be now described in connection with Figs. 8, 9 and 10.

Figure 8:
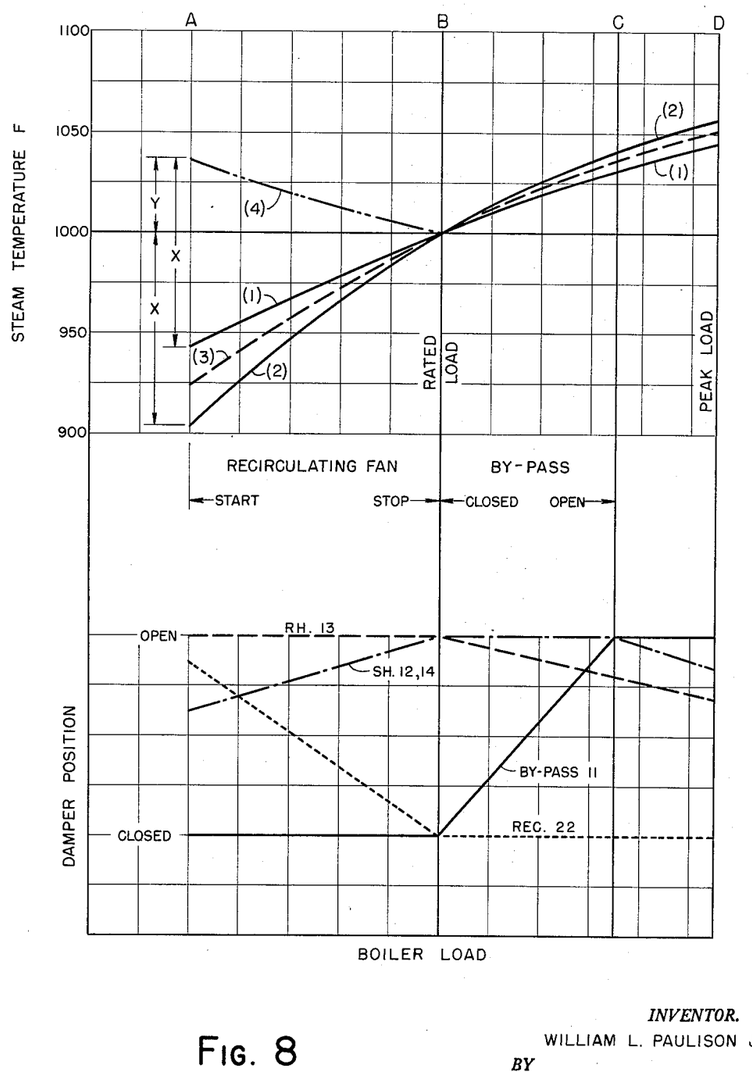

Fig. 8 depicts the application of the invention utilizing gas recirculation in the lower range, gas by-passing in a higher intermediate range, and gas flow proportioning with wide open by-pass in the upper load range to an ideal unit design wherein the superheater steam temperature and the reheat steam temperature (without any control modifications) reach their optimum values at the same load. Characteristic curves (1) and (2) meet and cross on the Control Point at Rated Load so that Rated Load is (as in Fig. 7) Control Point Load. As the RH temperature usually falls faster than the SH temperature with reduction in load, it will be below at the low load range and above at the high load range. Curve (3) again indicates the expected characteristic if SH and RH are balanced and is the same as (3) of Fig. 7.

For this design the selective relay 46 switches the basic or fundamental control impulse from RH (the lower temperature) in the lower load range, to SH (now the lower temperature) in the upper load range, with respect to both gas recirculation and gas by-passing. Of course the reverse would apply if curves (1) and (2) were interchanged. This is not probable, as the precaution is usually taken of placing the reheater surface in a relatively low temperature gas zone in order to give it proper protection under abnormal operation when there is no steam flow through the reheater tubes.

For the low load range A—B during which gas recirculation is used, Fig. 8 indicates that the SH dampers 12, 14 will be throttled as the load decreases, the RH dampers 13 wide open, and the gas by-pass damper 11 closed.

In the intermediate load range B—C, with the gas by-pass damper 11 gradually opening, the SH dampers 12, 14 are held wide open, and the RH dampers 13 are gradually throttled. Through this range the SH temperature is the lower of the two and it now dictates the gas recirculation and gas by-pass regulation, while RH positions the RH dampers 13.

Through the upper load range C—D in which the gas by-pass damper 11 is wide open, both the SH dampers 12, 14 and RH dampers 13 will be throttled.

For this design of boiler I provide a method and apparatus whereby a sequential operation of the SH dampers is accomplished, one only being throttled at a time, up to the highest load range where both are throttled but not necessarily at the same rate.

Figure 9:
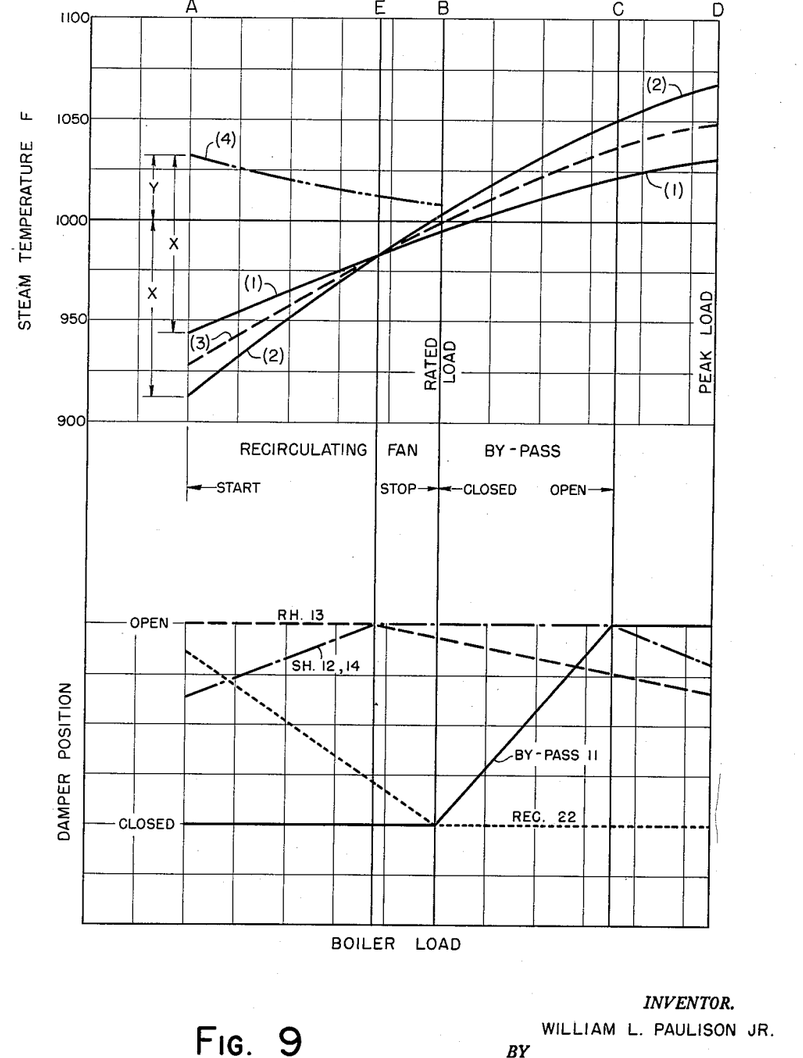

Fig. 9 depicts a design or operation wherein the SH and RH characteristic curves cross below the Control Point Load. This is not a desirable design but the condition may obtain during operation of a more conventionally designed boiler. Recirculation is effected below Control Point Load and gas by-pass above.

The SH dampers 12, 14 are throttled over the range A—E, open over range E—C encompassing a portion of the recirculation range and the gas by-passing range, and again throttled over range C—D.

The RH dampers 13 are wide open over range A—E and then throttled through range E—D.

Figure 10:
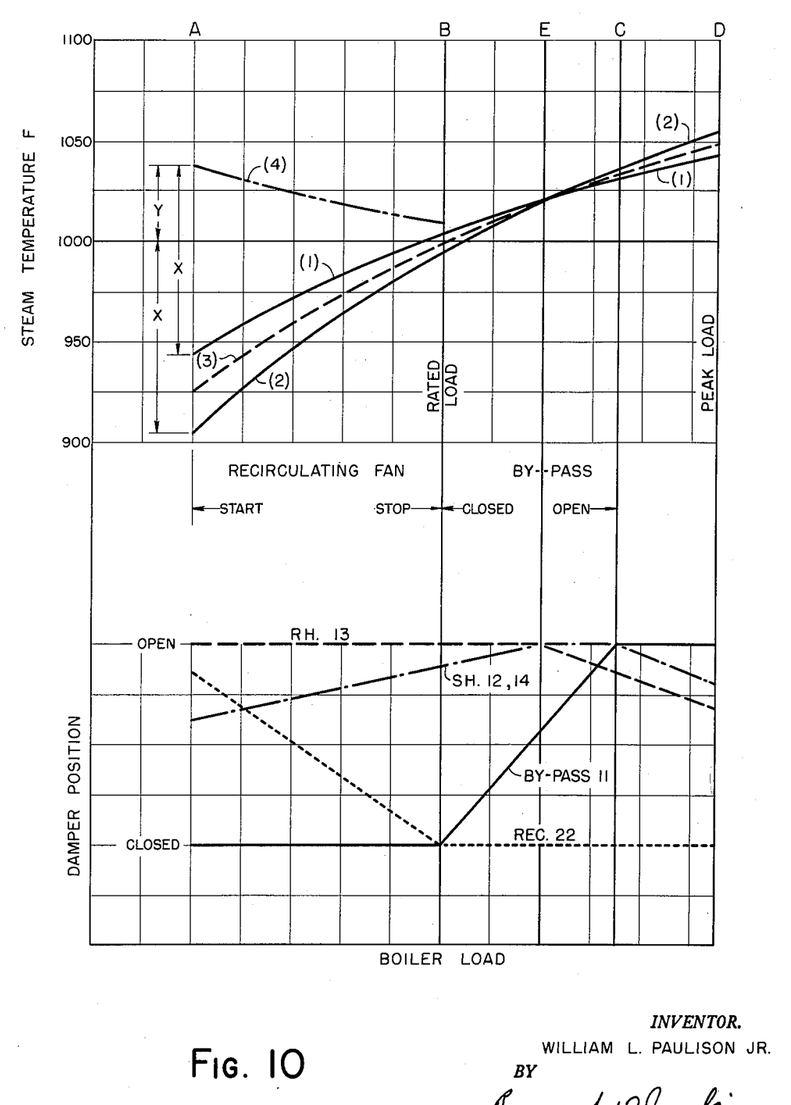

Fig. 10 shows the conditions and operations where the RH and SH curves cross at a higher load than the Control Point Load. Here again it is hardly likely that the unit would be so designed but the condition might exist during operation of a more conventionally designed unit.

The operation is similar to that of Fig. 9 with the difference that SH dampers 12, 14 are throttled way up into the gas by-pass range, with the RH dampers 13 wide open.

While Figs. 8, 9 and 10 illustrate conditions and operations in accordance with my invention for possible boiler designs, it is expected that the most usual design will produce characteristic curves as in Fig. 7. However, during operation of a boiler designed as in Fig. 7, operating variables and conditions may result in a crossing of the RH and SH curves at most any place in the Controllable Load Range. Thus, the conditions depicted in Figs. 8, 9 or 10 may exist during operation of a unit designed as in Fig. 7, and the method and apparatus of my invention will satisfactorily handle the situation to always tend to bring SH and RH temperatures to their individual desired value through the Controllable Load Range.

The invention is applicable to other types and arrangements of fuel burning equipment and with other fuels. Tiltable burners, controlled vertical firing, as well as oil or gas in suspension may be employed. The vapor produced and superheated or reheated may be other than steam. The steam or other vapor passed through the reheater section need not be the same steam or vapor that passes through the primary and secondary superheaters but may come from any source. The recirculated flue gas need not be introduced into the hopper bottom but preferably at a location early in the combustion zone. The unit may have various combinations of radiant and convection super-heaters and I illustrate and describe only a preferred arrangement.

It will be appreciated that I have chosen to illustrate and describe certain preferred embodiments of my invention but that the invention may be embodied in other forms, and thus I do not desire to be limited to the specific showing disclosed.

What I claim as new, and desire to secure by Letters Patent of the United States, is:

1. In a vapor generating and superheating unit of the type having a fluid-cooled combustion zone with a heating gas outlet in one end portion and having convection vapor superheating surfaces positioned beyond the combustion zone in the direction of heating gas flow, the method of operation which comprises, introducing fuel and air for combustion into the combustion zone at a rate to satisfy demand upon the unit, increasing the heat availability of the gases leaving the outlet as rating decreases through a lower range of rating by increasingly recirculating partially cooled products of combustion from the heating gas path beyond the superheating surfaces back to the combustion zone, maintaining optimum final vapor temperature through controllably by-passing some of the heating gases around at least a portion of the superheating surfaces through an upper range of ratings in direction tending to increase the by-passing as superheated vapor temperature tends to increase and vice versa, and regulating the recirculation of gases and the by-passing of gases conjointly in response to a rating index and to superheated vapor temperature.

2. In a vapor generating and superheating unit of the type having a fluid-cooled combustion zone with a heating gas outlet in one end portion thereof and having convection vapor superheater surfaces positioned beyond the combustion zone outlet in the path of heating gas flow, the method of operation which comprises introducing fluent fuel and air for combustion into the combustion zone spaced from the heating gas outlet, regulating the total rate of fuel and air supply in accordance with an index of demand upon the unit to increase supply rate as demand increases, varying the heat availability of the heating gases leaving the heating gas outlet to the convection heating surfaces through recirculating a portion of the partially cooled gases from beyond the furnace outlet back to the combustion zone through a range of lower ratings in direction tending to increase recirculation as rating decreases and vice versa, by-passing a controllable portion of the heating gases around at least a portion of the superheating surfaces through a range of upper ratings in direction tending to increase the by-passing as superheat temperature increases and vice versa, controlling both the recirculation and the by-passing conjointly responsive to a rating index and to a determination of superheated vapor temperature, and sequentially regulating recirculation and by-passing through the lower range and upper range of operating ratings across the rated load unit operation.

3. In a vapor generating and superheating unit of the type having a fluid-cooled combustion zone with a heating gas outlet in one end portion thereof and having convection vapor superheating surface positioned beyond the combustion zone outlet in the path of heating gas flow, the method of operation which comprises introducing fluent fuel and air for combustion into the combustion zone spaced from the heating gas outlet, regulating the total rate of fuel and air supply in direct accordance with an index of demand upon the unit, varying the heat availability of the heating gases leaving the heating gas outlet to the convection heating surfaces through recirculating a portion of the partially cooled gases from beyond the furnace outlet back to the combustion zone in direction tending to increase recirculation as rating decreases and vice versa, by-passing a controllable portion of the heating gases around at least a portion of the superheating surfaces in direction tending to increase the by-passing as superheat temperature increases and vice versa, and continuously controlling both the recirculation and the by-passing continuously conjointly responsive to a rating index and to a determination of superheated vapor temperature.

4. The method of claim 3 wherein the rating index is rate of flow of generated vapor.

5. The method of claim 3 wherein the recirculation is through a range of lower ratings while the by-passing is through a range of upper ratings, the two regulations being sequentially carried out.

6. The method of claim 5 wherein the sequential operation of the recirculation and the bypassing is such that one becomes ineffective before the other becomes effective.

7. Apparatus for generating and superheating vapor including in combination, an upright elongated furnace having fluid-cooled walls and a heating gas outlet in one portion thereof, a convection superheater positioned beyond the gas outlet in the path of heating gas flow leaving the furnace, a controllable supply of the elements of combustion for the furnace, control means for the supply sensitive to demand upon the unit in direction tending to increase supply rate as demand increases, fan and duct means arranged to recirculate heating gas from a location beyond the superheater back to the combustion zone of the furnace, a gas by-pass around at least a portion of the superheater, rating determining means for the unit, superheated vapor temperature determining means, and adjusting means for the recirculating means and the by-pass conjointly responsive to both determining means. the adjusting means acting in direction tending to vary the recirculation inversely with both rating and temperature while varying the by-passing directly with both rating and temperature.

8. The combination of claim 7 wherein the control means for the supply of the elements of combustion is sensitive to generated vapor pressure.

9. The combination of claim 7 wherein the rating determining means is a generated vapor flow rate meter.

10. The combination of claim 7 including sequentially responsive means for the said adjusting means arranged to actuate the recirculating means over a range of lower ratings and to actuate the by-pass over a different range of upper ratings.

11. In a vapor generating and superheating unit of the type having a fluid-cooled combustion zone with a heating gas outlet in one end portion thereof and having convection vapor superheating surface and convection vapor reheating surface positioned beyond the combustion zone outlet in the path of heating gas flow, the method of operation which comprises introducing fluent fuel and air for combustion into the combustion zone spaced from the heating gas outlet, regulating the total rate of fuel and air supply in accordance with an index of demand upon the unit to increase supply rate as demand increases, varying the heat availability of the heating gases leaving the heating gas outlet to the convection heating surfaces through recirculating a portion of the partially cooled gases from beyond the furnace outlet back to the combustion zone, by-passing a controllable portion of the heating gases around at least a portion of the superheating surfaces, passing a flow of vapor to be reheated through the reheating surface, and controlling both the recirculation and the by-passing responsive to a rating index and to the final temperature of both the generated vapor leaving the vapor superheating surfaces and of the reheated vapor leaving the vapor reheating surface, the controlling of the recirculation being generally in direction inversely with both rating and the temperatures while the controlling of the by-passing being generally in the same direction as variations of rating or the temperatures.

12. The method of claim 11 including regulating the heating gas flow over the superheating surfaces conjointly responsive to the rating index and the final superheated vapor temperature while regulating the heating gas flow over the reheating surfaces conjointly responsive to the rating index and the final reheated vapor temperature.

13. The method of claim 12 wherein the control of the recirculation and of the by-passing is selectively under the conjoint domination of the rating index and the lesser of the two temperatures.

14. The method of claim 13 wherein the recirculation and the by-passing are sequentially effective.

15. The method of claim 14 including proportioning the heating gas flow which is not by-passed between the superheating surface and the reheating surface to maintain predetermined relation between the final vapor temperatures regardless of values.

16. The method of claim 15 wherein the proportioning is sequential with regard to the recirculation and by-passing.

17. Apparatus for generating and superheating vapor including in combination, an upright elongated furnace having fluid-cooled walls and a heating gas outlet in one portion thereof, a convection superheater positioned beyond the gas outlet in the path of heated gas flow leaving the furnace, a second convection superheating surface for reheating vapor also positioned beyond the gas outlet in a parallel path of heated gas flow leaving the furnace, a supply of vapor to be reheated, a controllable supply of the elements of combustion for the furnace, control means for the supply sensitive to demand upon the unit and acting in direction generally to increase the supply rate as demand increases and vice versa, fan and duct means arranged to recirculate heating gas from a location beyond the superheater and reheater back to the combustion zone of the furnace, a gas by-pass around at least a portion of the superheater and reheater, rating determining means for the unit, superheated vapor temperature determining means, reheated vapor temperature determining means, and adjusting means for the recirculating means and the by-pass conjointly responsive to all three determining means, the adjusting means acting generally to vary the rate of recirculation in direction inversely with both rating and the temperatures while the adjustment of the by-passing is generally in the same direction as variations of rating or the temperatures.

18. Apparatus for generating and superheating vapor including in combination, a furnace having fluid-cooled walls and a heating gas outlet in one portion thereof, a convection vapor superheater and a convection vapor reheater positioned beyond the gas outlet in the direction of heating gas flow leaving the furnace, a controllable supply of the elements of combustion for the furnace, control means for the supply sensitive to demand upon the unit and acting in direction generally to increase the supply rate as demand increases and vice versa, fan and duct means arranged to recirculate heating gas from a location beyond the superheater and reheater back to the combustion zone of the furnace, a gas by-pass around at least a portion of the superheating and reheating surfaces, a supply of vapor to be heated in the reheater, rating index determining means for the unit, final superheated vapor temperature determining means, final reheated vapor temperature determining means, control means for the recirculating means and control means for the by-pass, adjusting means for the recirculating control means and the by-pass control means acting in direction tending to vary recirculation inversely with rating and by-passing in the same direction as rating varies and responsive to the rating index means and selective means making the adjusting means also responsive to one of the two temperature determining means selectively dependent upon which final temperature is the lower.

19. The combination of claim 18 including means coacting with the adjusting means sequentially activating the recirculating control means and the by-pass control means over preselected ranges of unit rating.

20. The combination of claim 19 including damper means for the gas flow over the superheater and separate damper means for the gas flow over the reheater, and regulating means for the damper means positioning the same to proportion heating gas flow therebetween to maintain predetermined relation between the two final vapor temperatures regardless of absolute values.

21. The combination of claim 20 including relay means sequentially actuating said damper regulating means with regard to the recirculating control means and the by-pass control means.

22. The method of operating a vapor generating unit having a convection superheater and a convection reheater disposed respectively in divided and separate parallel gas flow paths from the same combustion zone, the superheater and reheater having uncontrolled load-temperature characteristic curves with different degrees of slope; the method including varying the heat availability of the heating gases passing over the superheater and reheater to maintain superheat and reheat temperatures at predetermined values through a load range below a predetermined control point load, limiting superheat and reheat temperatures by gas by-passing through a load range above the control point load, and proportioning unby-passed heating gas flow between the parallel paths, the proportioning being accomplished through selectively throttling the gas flow over the superheater only or over the reheater only selectively in accordance with predominance of one of the final vapor temperatures over the other.

23. The method of automatically operating a vapor generating unit having a convection superheater and a convection reheater disposed respectively in divided and separate parallel gas flow paths from the same combustion zone, the superheater and reheater having uncontrolled load-temperature characteristic curves with different degrees of slope; the method including continuously varying the heat availability of the heating gases passing over the superheater and reheater to maintain superheat and reheat temperatures at predetermined values through a load range below a predetermined control point load, continuously limiting superheat and reheat temperatures through a load range above the control point load, and continuously proportioning the total heating gas flow between the parallel paths through both load ranges, the proportioning being automatically accomplished through selectively throttling the gas flow over the superheater only or reheater only selectively in accordance with predominance of one of the final vapor temperatures over the other.

24. Apparatus for generating and superheating vapor including in combination, a furnace having fluid-cooled walls and a heating gas outlet in one portion thereof, a convection vapor superheater and a convection vapor reheater positioned in parallel paths beyond the gas outlet in the direction of heating gas flow leaving the furnace, a controllable supply of the elements of combustion for the furnace, control means for the supply sensitive to demand upon the unit and acting in direction generally to increase the supply rate as demand increases and vice versa, fan and duct means arranged to recirculate heating gas from a location beyond the superheater and reheater back to the combustion zone of the furnace, a supply of vapor to be heated in the reheater, rating determining means for the unit, final superheated vapor temperature determining means, final reheated vapor temperature determining means, adjusting means for the recirculating means conjointly responsive to the three determining means, the adjusting means acting in direction tending to vary the recirculation rate inversely with both rating and the temperatures, damper means for regulating the flow of heating gases over the superheater surface, damper means for regulating the flow of heating gases over the reheater surface, regulating means for the superheater damper means responsive to the rating determining means and the final superheated vapor temperature determining means, regulating means for the reheater damper means responsive to the rating determining means and the final reheated vapor temperature determining means, the regulating means acting to proportion the heating gases over the superheating surface and the reheating surface in direction tending to return each final vapor temperature toward its preselected value upon departure therefrom, and relay means selectively making effective the two damper regulating means responsive to the predominance of one of the final vapor temperatures over the other.

25. In a vapor generating and superheating unit of the type having a fluid-cooled combustion zone with a heating gas outlet in one end portion thereof and having convection vapor superheating surface and convection vapor reheating surface positioned beyond the combustion zone outlet in the path of heating gas flow, the method of operation which comprises introducing fluent fuel and air for combustion into the combustion zone spaced from the heating gas outlet, regulating the total rate of fuel and air supply in accordance with an index of demand upon the unit and acting in direction generally to increase the supply rate as demand increases and vice versa, varying the heat availability of the heating gases leaving the heating gas outlet to the convection heating surfaces through recirculating a portion of the partially cooled gases from beyond the furnace outlet back to the combustion zone throughout a selected lower range of unit ratings, generally varying recirculation in direction to increase recirculation as rating decreases and vice versa, by-passing a controllable portion of the heating gases around at least a portion of the superheating and reheating surfaces in the direction of the main heating gas flow, generally varying the by-passing in direction to increase by-passing as rating increases and vice versa, passing a flow of vapor to be reheated through the reheating surface, selectively controlling the recirculation and the by-passing conjointly responsive to a rating index and to the final temperature of the super heated vapor or conjointly responsive to the rating index and to the final temperature of the reheated vapor selectively dependent upon which of the final temperatures is the lower, the recirculation and the by-passing being sequentially carried out throughout a selected total range of unit ratings, and proportioning the heating gas flow which is not by-passed between the superheating surface and the reheat surface to maintain predetermined relation between the final vapor temperatures regardless of specific values, generally increasing gas flow to the path having lower final vapor temperature and vice versa, the proportioning being accomplished through selectively throttling the gas flow over the superheater only or over the reheater only selectively in accordance with predominance of one of the final vapor temperatures over the other.

26. In a vapor generating and superheating unit of the type having a fluid-cooled combustion zone with a heating gas outlet in one end portion thereof and having convection vapor superheating surface and convection vapor reheating surface positioned beyond the combustion zone outlet in the path of heating gas flow, the method of controlling operation which comprises continuously introducing fluent fuel and air for combustion into a combustion zone spaced from the heating gas outlet, continuously regulating the total rate of fuel and air supply in accordance with an index of demand upon the unit and acting in direction generally to increase the supply rate as demand increases and vice versa, varying the heat availability of the heating gases leaving the heating gas outlet to the convection heating surfaces through regulably recirculating a portion of the partially cooled gases from beyond the furnace outlet back to the combustion zone while operating over a selected lower range of unit ratings, generally varying recirculation in direction to increase recirculation as rating decreases and vice versa, regulably by-passing a controllable portion of the heating gases around at least a portion of the superheating and reheating surfaces in the direction of the main heating gas flow throughout a selected upper range of unit ratings, generally varying the by-passing in direction to increase by-passing as rating increases and vice versa, passing a flow of vapor to be reheated through the reheating surface, continuously selectively controlling the recirculation and the by-passing conjointly responsive to a rating index and to the final temperature of the superheated vapor or conjointly responsive to the rating index and to the final temperature of the reheated vapor selectively dependent upon which of the final temperatures is the lesser, the recirculation and the by-passing being sequentially carried out continuously throughout a selected total range of unit ratings, and automatically proportioning the heating gas flow which is not by-passed between the superheating surface and the reheat surface to maintain predetermined relation between the final vapor temperatures regardless of their specific values, generally increasing gas flow to the path having lower final vapor temperature and vice versa, the automatic proportioning being sequentially accomplished through selectively continuously throttling the gas flow over the superheater only or over the reheater only selectively in accordance with predominance of one of the final vapor temperatures over the other.

27. Apparatus for generating and superheating vapor including in combination, a furnace having fluid-cooled walls and a heating gas outlet in one portion thereof, a convection vapor superheater and a convection vapor reheater positioned beyond the gas outlet in the direction of heating gas flow leaving the furnace, a controllable supply of the elements of combustion for the furnace, control means for the supply sensitive to demand upon the unit and acting in direction generally to increase the supply rate as demand increases and vice versa, fan and duct means arranged to recirculate heating gas from a location beyond the superheater and reheater back to the combustion zone of the furnace, a gas by-pass around at least a portion of the superheating and reheating surfaces, a supply of vapor to be heated in the reheater, rating index determining means for the unit, final superheated vapor temperature determining means, final reheated vapor temperature determining means, control means for the recirculating means and control means for the by-pass, adjusting means for the recirculating control means and the by-pass control means responsive to the rating index means, the adjusting means acting in general to increase recirculation as rating decreases and the by-pass control means acting in general to increase by-passing of gases as rating increases, selective means making the adjusting means also responsive to one of the two temperature determining means selectively dependent upon which final temperature is the lower, means coacting with the adjusting means sequentially activating the recirculating control means and the by-pass control means over preselected ranges of unit rating, damper means for the gas flow over the superheater and separate damper means for the gas flow over the reheater, regulating means for the damper means positioning the same to proportion heating gas flow therebetween to maintain predetermined relation between the two final vapor temperatures regardless of absolute values, the regulating means acting in general to increase gas flow to the path having the lower vapor temperature and vice versa, and relay means selectively making effective the two damper regulating means responsive to the predominance of one of the final vapor temperatures over the other.

28. The method of operating a vapor generating unit having a convection superheater and a convection reheater disposed respectively in divided and separate parallel gas flow paths from the same combustion zone, the superheater and reheater having crossing uncontrolled load-temperature characteristic curves, the method including varying the heat availability of the heating gases passing over the superheater and reheater to maintain superheat and reheat temperatures at predetermined values through a load range below a predetermined control point load, limiting superheat and reheat temperatures through a load range above the control point load, and proportioning total heating gas flow between the parallel paths throughout a controllable load range, the proportioning following (upon increase in load) a sequence of steps, namely, (1) variably restricting gas flow over the superheater without reheater gas flow throttling, (2) variably restricting gas flow over the reheater without superheater gas flow throttling, and (3) concurrent throttling of the gas flow through both heating paths.

29. Apparatus for generating and superheating vapor including in combination, a furnace having fluid-cooled walls and a heating gas outlet in one portion thereof, a convection vapor superheater and a convection vapor reheater positioned beyond the gas outlet in the direction of heating gas flow leaving the furnace, a controllable supply of the elements of combustion for the furnace, control means for the supply sensitive to demand upon the unit, fan and duct means arranged to recirculate heating gas from a location beyond the superheater and reheater back to the combustion done of the furnace, a supply of vapor to be heated in the reheater, rating determining means for the unit, final superheated vapor temperature determining means, final reheated vapor temperature determining means, adjusting means for the recirculating means conjointly responsive to the three determining means, damper means for regulating the flow of heating gases over the superheater surface, damper means for regulating the flow of heating gases over the reheater surface, reguating means for the superheater damper means responsive to the rating determining means and the final superheated vapor temperature determining means, regulating means for the reheater damper means responsive to the rating determining means and the final reheated vapor temperature determining means, and relay means sequentially making effective the two damper regulating means over predetermined rating ranges.

30. The method of operating a vapor generating unit having a convection superheater and a convection reheater disposed respectively in divided and separate parallel gas flow paths from the same combustion zone, the superheater and reheater having uncontrolled load-temperature characteristic curves with different degrees of slope; the method including limiting superheat and reheat final temperatures by gas by-passing through a predetermined upper load range, generally increasing gas by-passing as load increases, and proportioning unby-passed heating gas flow between the parallel paths through at least the same load range, the proportioning of unby-passed heating gas flow between the parallel paths being generally to supply an increasing flow to the path having the lower vapor temperature, the proportioning being accomplished through selectively throttling the gas flow over the superheater only or over the reheater only selectively in accordance with predominance of one of the final vapor temperatures over the other.

References Cited in the file of this patent

UNITED STATES PATENTS

| | | |
|---|---|---|
| 1,975,086 | Dickey | Oct. 2, 1934 |
| 2,100,190 | Jackson | Nov. 23, 1937 |
| 2,229,643 | DeBaufre | Jan. 28, 1941 |
| 2,298,700 | Junkins et al. | Oct. 13, 1942 |
| 2,357,300 | Bailey | Sept. 5, 1944 |
| 2,575,885 | Mittendorf | Nov. 20, 1951 |
| 2,590,712 | Lacerenza | Mar. 25, 1952 |
| 2,649,079 | Van Brunt | Aug. 18, 1953 |
| 2,730,080 | Stallkamp | Jan. 10, 1956 |
| 2,737,930 | Rowand et al. | Mar. 13, 1956 |

FOREIGN PATENTS

| | | |
|---|---|---|
| 112,287 | Australia | Jan. 3, 1941 |
| 504,114 | Great Britain | Apr. 14, 1939 |
| 516,070 | Great Britain | Dec. 21, 1939 |
| 523,871 | Great Britain | July 24, 1940 |

UNITED STATES PATENT OFFICE

CERTIFICATE OF CORRECTION

Patent No. 2,985,152                                    May 23, 1961

William L. Paulison, Jr.

It is hereby certified that error appears in the above numbered patent requiring correction and that the said Letters Patent should read as corrected below.

Column 2, line 10, for "temeprature" read -- temperature --; column 13, line 5, after "dampers" insert -- and RH dampers --; column 15, line 11, for "means." read -- means, --; column 20, line 14, for "done" read -- zone --; line 23, for "reguating" read -- regulating --.

Signed and sealed this 12th day of December 1961.

(SEAL)
Attest:

ERNEST W. SWIDER
Attesting Officer

DAVID L. LADD
Commissioner of Patents
USCOMM-DC